April 7, 1964   C. A. BERGQUIST   3,127,799
REVERSIBLE RATCHET DRIVE
Filed May 3, 1962
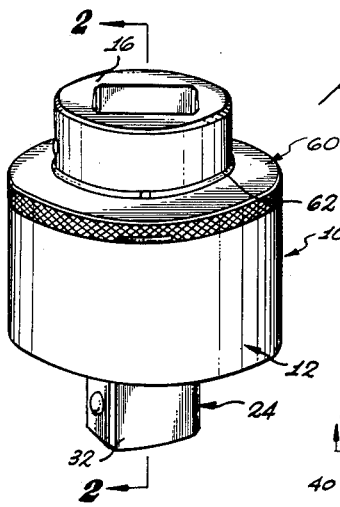
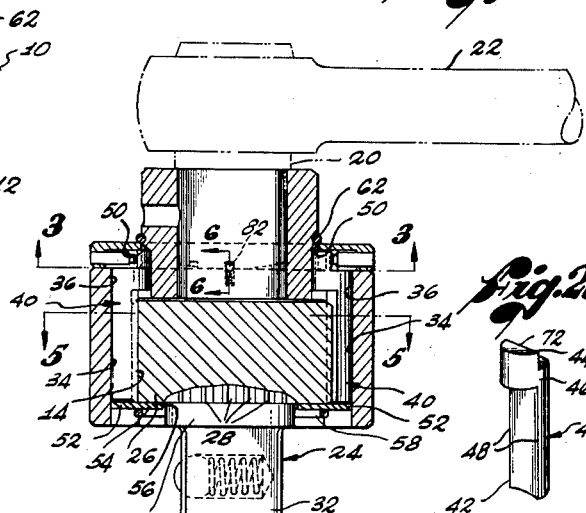
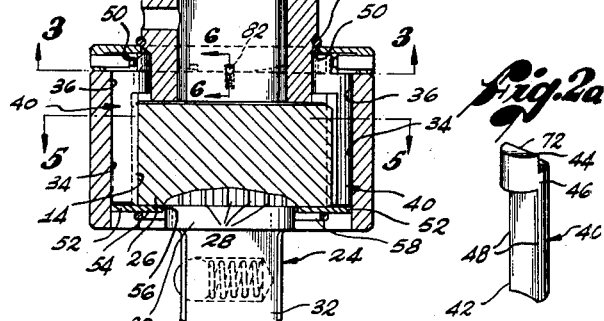
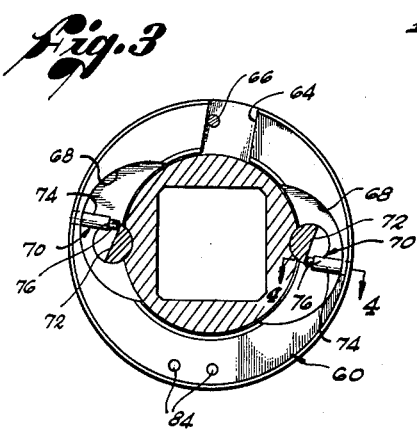
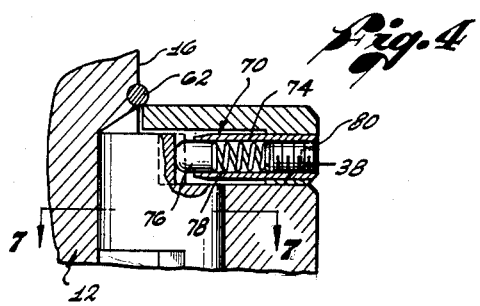
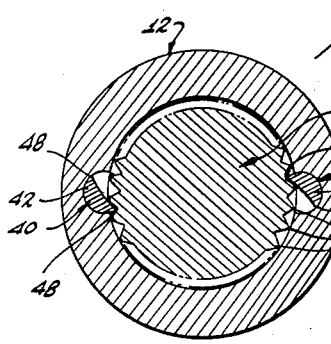
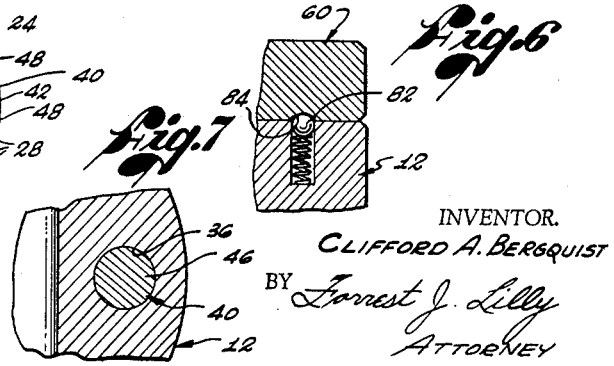
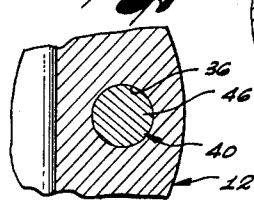
INVENTOR.
CLIFFORD A. BERGQUIST
BY Forrest J. Lilly
ATTORNEY ३,127,799
REVERSIBLE RATCHET DRIVE
Clifford A. Bergquist, Monterey Park, Calif., assignor to Pendleton Tool Industries, Inc., Los Angeles, Calif., a corporation of California
Filed May 3, 1962, Ser. No. 192,221
2 Claims. (Cl. 81—62)

This invention relates generally to torque-applying tools and has as its primary object to provide an improved reversible ratchet drive for such tools.

Another object of the invention is to provide a reversible ratchet drive of the character described having ratchet pawls whose ratcheting motion is rotational about central axes of the respective pawls and which are rotatably supported in a unique way which assures proper ratcheting action of the drive.

Yet another object of the invention is to provide a reversible ratchet drive having a unique mechanism for reversing the ratchet pawls, and thereby the ratcheting direction of the drive, which mechanism has a toggle-like snap action, furnished in part by the pawls themselves, that yieldably urges the mechanism to and retains the mechanism in its operative positions.

A further object of the invention is to provide a reversible ratchet drive which is relatively simple in construction, easy to assemble, economical to manufacture, and otherwise ideally suited to its intended purposes.

Other objects, advantages, and features of the invention will become readily evident as the description proceeds.

Briefly, the objects of the invention are attained by providing a ratchet drive having a body with a bore in which is rotatably mounted a ratchet wheel. Formed in the wall of and opening radially to this bore are two generally semicircular pawl recesses continuing at one end in cylindrical journal bores, respectively, that open through an end of the body.

Ratchet pawls fitted in these recesses, respectively, have circular portions journaled in the journal bores in the body. The ends of the pawls within the pawl recesses are relieved to a generally semicircular cross section to provide each pawl with two longitudinal edges. These pawl edges are selectively engageable with ratchet teeth about the periphery of the ratchet wheel, to lock the latter against rotation in one direction or the other with respect to the ratchet body, by rotation of the pawls in their recesses.

The above-described journaling of the pawls in the ratchet body assures proper ratcheting and ratchet reversing action of the pawls and constitutes one important feature of the invention.

A second important feature of the invention resides in an improved reversing mechanism for reversing the ratchet pawls in the ratchet body and, thereby, the ratcheting direction of the drive. This pawl reversing mechanism has a unique toggle-like snap action which tends to urge the mechanism to and retain it in its operative positions. The snap action is derived from the reaction force exerted on the pawl reversing member of the mechanism by the spring pressure of certain pawl biasing plungers against the ratchet pawls and by a snap reversing motion of the pawls which occurs during movement of the member between its operative positions.

The ratchet drive is also uniquely designed for ease of manufacture and assembly, such design constituting a third important feature of the invention.

Other unique features of construction and operation of the drive will become evident as the description proceeds.

The invention will now be described in greater detail by reference to the attached drawing, wherein:

FIG. 1 is a perspective view of a ratchet drive embodying the present reversible ratchet drive;

FIG. 2 is a section taken on line 2—2 in FIG. 1 showing, in phantom lines, a non-ratcheting wrench drivably engaged with the drive;

FIG. 2a is a perspective view of a ratchet pawl removed from the ratchet drive of FIGS. 1 and 2;

FIG. 3 is a section taken on line 3—3 in FIG. 2;

FIG. 4 is an enlarged section taken on line 4—4 in FIG. 3;

FIG. 5 is a section taken on line 5—5 in FIG. 2;

FIG. 6 is an enlarged section taken on line 6—6 in FIG. 2; and

FIG. 7 is a section on reduced scale taken on line 7—7 in FIG. 4.

The ratchet drive 10 illustrated in this drawing will be seen to comprise an outer cylindrical member or body 12 having a bore 14 extending into one of its ends and a reduced diameter coaxial extension 16 on its other end. Extending axially through the body extension is a polygonal socket 18 for receiving the polygonal shank 20 of a non-ratcheting socket wrench 22. The illustrated ratchet drive, then, is also a ratchet adapter for affording a non-ratcheting socket wrench with a reversible ratcheting action.

Designated by the numeral 24 is an inner driven member or ratchet wheel having an enlarged, generally cylindrical portion 26 rotatably received within the bore 14 in body 12. This portion of the ratchet wheel has ratchet teeth 28 about its periphery. Extending coaxially from the enlarged portion 26 of the ratchet wheel 24 is a cylindrical shoulder 30 of substantially smaller diameter than said portion. Shoulder 30 continues in a further reduced, polygonal shank 32 to be inserted in a wrench socket, or the like, not shown.

Body 12 of the ratchet drive has two diametrically opposed pawl recesses 34 extending axially therethrough. These pawl recesses may comprise, for example, bores which are drilled through the body before the coaxial bore 14. The pawl bores are located to be intersected by bore 14 so that the pawl recesses 34 are generally semicircular in cross section. Actually, the angular extent of the semicircular walls of the pawl recesses will be observed to be slightly greater than 180°. The pawl recesses 34 continue at their upper ends in pawl journal bores 36 which open through the annular shoulder 38 of the body 12 at the base of the body extension 16. These journal bores cut slightly into the sides of the extension, as shown.

Rotatably fitted in the pawl recesses 34 and journal bores 36, respectively, are ratchet pawls 40. As may be best observed in FIG. 4, each pawl 40 comprises a relatively long, generally semicylindrical end 42, a relatively short, generally semicylindrical end 44, and an intermediate cylindrical journal portion 46 between these ends. The two semicylindrical ends 42 and 44 face in diametrically opposite directions. The long semicylindrical end 42 of each pawl has two longitudinal edges 48 formed by the intersections of the transverse face and cylindrical surface of the latter end of the pawl.

When the pawls are assembled in the body 12 of the ratchet drive, the long ends 42 of the pawls are located in the pawl recesses 34, respectively, the pawl journal portions 46 are located in the pawl journal bores 36, and the short ends 44 of the pawls protrude above the body shoulder 38. The pawls are dimensioned to have a slip fit in the pawl recesses 34 and journal bores 36. The journal portions 46 of the pawls are thereby journaled in the bores 36 within the ratchet body 12.

Upward axial movement of the ratchet pawls 40 in the pawl recesses 34, as the ratchet drive is viewed in FIGS. 1 and 2, is limited by engagement of the upper ends of the pawls with the overhanging shoulders 50 formed by the intersection of the pawl journal bores 36 with the side wall of the body extension 16. Closely fitted in the lower end of the body bore 14, and having lobes 52 fitting in the lower ends of the pawl recesses 34, is a cover plate 54. This cover plate has a central bore 56 receiving and relatively closely fitting the ratchet wheel shoulder 30. A snap ring 58, seating in a groove in the wall of bore 14, retains the cover plate in position. Cover plate 54, then, retains the ratchet pawls 40 in their pawl recesses 34 and the ratchet wheel 24 in its bore 14.

Rotatably fitted on the extension 16 of the ratchet body 12 and seating on the body shoulder 38 is an annular pawl reversing member or disc 60. The outer peripheral edge of this disc is knurled so that it may be easily rotated. A snap ring 62 fitting in a groove in the extension 16 retains the disc in position. As shown best in FIG. 3, the under surface of disc 60 has a radial slot 64. Extending axially from the body shoulder 38 into this slot is a stop pin 66 which is engageable with the side walls of the slot to limit rotation of the disc 60 with respect to the ratchet body 12. Also as shown in FIG. 3, the under surface of the disc has two diametrically opposed, generally semicircular recesses 68 which receive the protruding upper ends of the ratchet pawls 40.

Carried on the disc 60 are spring-loaded means 70 which bear against the upper transverse faces 72 of the ratchet pawls 40, respectively. As may be best observed in FIG. 4, each of the spring-loaded means 70 comprises a tube 74 which is press fitted in the disc 60 and extends into a disc recess 68. In FIG. 3, the tubes 74 will be seen to be set approximately on a common axis passing approximately through the center of the disc 60 and the centers of its recesses 68. Slidably fitted within each tube 74 is a plunger element 76. A spring 78 (only one shown) is contained within each tube 74 and acts between a set screw 80 (only one shown) threaded in the outer end of that tube and the respective plunger 76 to urge the latter against the transverse face 72 of the adjacent ratchet pawl 40.

When the disc 60 is set in the position illustrated in the drawing, the plungers 76 engage the transverse pawl faces 72 at one side of the pawl axes, respectively, as shown best in FIG. 3, and thereby urge the pawls 40 in a clockwise direction (as the pawls are viewed in FIG. 3) on their respective axes to the positions of FIG. 5. In these positions, one edge 48 of each pawl engages the ratchet teeth 28 on the ratchet wheel 24 to lock the ratchet body 12 against rotation in one direction with respect to the ratchet wheel 24, namely, the counterclockwise direction as the ratchet drive is viewed in FIG. 5. Accordingly, a counterclockwise torque applied to the ratchet body is transmitted through the pawls to the ratchet wheel. The ratchet body can, of course, rotate or ratchet in the opposite direction with respect to the ratchet wheel. During this latter relative rotation of the body, the ratchet teeth 28 cam the pawls out of the path of the teeth, agains the spring force exerted on the pawls by the plungers 76.

Rotation of the disc 60 in the counterclockwise direction, as it is viewed in FIG. 3, shifts the spring-loaded plungers 76 across the transverse pawl faces 72 from the positions of FIG. 3 to positions in which the plungers engage the pawls 40 at the opposite sides of their respective axes. The spring force of the plungers against the pawls then urges the latter in the counterclockwise direction on their axes to positions (not shown) in which the other pawl edges 48 engage the ratchet teeth 28 on the ratchet wheel 24. In these latter pawl positions, the ratchet body 12 is locked against clockwise rotation, as the drive is viewed in FIG. 5, with respect to the ratchet wheel 24. A clockwise torque exerted on the body is then transmitted through the ratchet pawls to the ratchet wheel. The ratchet body can, however, rotate or ratchet in the counterclockwise direction with respect to the ratchet wheel.

Thus, rotation of the disc 60 between the positions just described, which are hereinafter referred to as the limiting or operative, positions of the disc, reverses the ratchet pawls 40 in the ratchet body 12. Accordingly, the ratchet drive 10 can be preset for ratcheting in either direction by appropriate setting of the pawl reversing disc 60. Rotation of the disc is limited to the two positions described above by engagement of the stop pin 66 with the walls of the disc slot 64.

It will be observed in FIG. 3 that the spring pressure of the pawl biasing plungers 76 against the ratchet pawls 40 creates a reaction force on the pawl reversing disc 60 which yieldably urges the disc to and retains the disc in these positions with an overcenter toggle-like snap action. That is to say, when the plungers 76 are located to either side of the pawl axes, say, to the side shown in FIG. 3, the pawls are yieldably held in their respective ratcheting positions and the slope of the transverse pawl faces 72 with respect to their respective plungers is such as to create a camming action on the plungers in a direction to rotate the pawl reversing disc 60 to and retain it in its corresponding operative position. During reversal of the disc, when the plungers 76 move across the pawl axes, the pawls 40 immediately flip or rotate to their other ratcheting positions. The slope of the pawl faces 72 with respect to the plungers is thereby suddenly changed to create a camming action on the plungers which urges the disc to and retains it in its other operative position.

If desired, additional indexing means for the disc 60 may be provided, such as a spring-loaded detent or ball 82 carried on the body 12 and engageable, in each operative position of the pawl reversing disc 60, in recesses 84 in the under surface of the disc.

Operation of the ratchet drive 10 is obvious from the preceding description. Thus, a wrench socket (not shown), or the like, is placed on the shank 32 of the ratchet wheel 24 and is engaged with the work element (not shown) to be rotated. The ratchet reversing disc 60 is set in one or the other of its operative positions, depending upon the direction of rotation in which the work element is to be driven. A torque in this direction is then exerted on the ratchet body 12, by the handle 22, to rotate the work element in the desired direction. The ratchet body and handle may be periodically ratcheted in the opposite direction with respect to the ratchet wheel and work element, in the manner described earlier.

One important feature of the present ratchet drive resides in the aforedescribed journaling of the cylindrical journal portions 46 of the ratchet pawls 40 in the bores 36 within the ratchet body 12. Journaling of the pawls in this way effectively constrains the pawls against transverse rocking motion in the pawl recesses 34. If the pawls were not so journaled, they would be capable of rocking about transverse axes in the pawl recesses and toward the ratchet wheel 24. In this case, the spring pressure of the plungers 76 against the pawls would tend to hold the lower semicylindrical ends 42 of the pawls against the ratchet wheel during reversing of the pawls which might interfere with proper reversing of the pawls. Such freedom of transverse rocking motion of the pawls might also very likely interfere with proper ratcheting action of the drive.

A second important feature of the present ratchet drive resides in the pawl reversing mechanism including the pawl reversing disc 60. This mechanism will be observed to be relatively simple in construction and operation and to be relatively immune to malfunctioning, even after a long period of use. Also, as described earlier, these pawl reversing means are so arranged that the ratchet pawls 40 cooperate with the other parts of the mechanism to create a toggle-like snap action which tends to urge the pawl reversing disc to and retain it in its operative positions.

A third important feature of the present ratchet drive resides in its ease of assembly. Thus, the several parts of the drive can be assembled prior to insertion of the plungers 76, springs 78, and set screws 80 in the plunger tubes 74. After the parts are thus assembled, the plungers, springs, and set screws can be inserted in the tubes. In this way, it is unnecessary to provide stop means to retain the plungers in the tubes since the plungers will be retained in the tubes by engagement of the plungers with the ratchet pawls.

It is obvious that while the ratchet drive herein described and illustrated is in the form of a ratchet adapter for affording a non-ratcheting wrench with a ratcheting action, the drive may be directly incorporated in a ratchet wrench. Also, while two diametrically opposed ratchet pawls are shown, the present ratchet drive could conceivably utilize only one pawl or two or more pawls which are spaced less than 180° apart. It is also evident that the features of the present ratchet drive may be embodied in an open end ratchet wrench.

Clearly, then, the invention herein described and illustrated is fully capable of attaining the several objects and advantages set forth.

What is claimed is:

1. A ratchet drive comprising:
a body having a bore opening through one end of the body,
means for turning said body,
a ratchet wheel rotatably mounted in said bore and having ratchet teeth about its periphery,
means on said ratchet wheel accessible at said one end of said body for drivably coupling said wheel to an element to be rotated,
a generally semicircular recess in the wall of and opening to said bore and continuing at one end in a journal bore opening through one end of said body,
a ratchet pawl having one generally semicylindrical end positioned in said recess, a cylindrical intermediate portion journaled in said journal bore, and another semicylindrical end projecting beyond the other end of said body,
said other end of said pawl having a transverse face approximately parallel to the rotation axis of the pawl,
said one end of said pawl having two longitudinal edges selectively engageable with said ratchet teeth by rotation of said pawl in said recess to lock said body and ratchet wheel against relative rotation in one direction or the other depending upon which pawl edge edge engages said teeth,
a pawl reversing member rotatably mounted on the other end of said body,
a plunger tube carried on and extending generally radially of said pawl reversing member to a position in the vicinity of said transverse pawl face,
there being an opening through said tube which opens to the outside of said latter member,
a plunger slidably fitted in said one end of said tube and engaging said transverse pawl face,
a spring in said tube seating at one end against said plunger,
a set screw threaded in the other end of said tube and seating against the other end of said spring,
said set screw being accessible exteriorly of said member, and
said member being rotatable on said body between one position in which said plunger engages said pawl at one side of its rotation axis, whereby to resiliently urge one pawl edge into engagement with said ratchet teeth, and another position wherein said plunger engages said pawl at the opposite side of its rotation axis, whereby to resiliently urge the other pawl edge into engagement with said ratchet teeth.

2. A ratchet drive comprising:
a body having a bore opening through one end of the body,
means for turning said body,
a ratchet wheel rotatably mounted in said bore and having ratchet teeth about its periphery,
means on said ratchet wheel accessible at said one end of said body for drivably coupling said wheel to an element to be rotated,
a generally semicircular recess in the wall of and opening to said bore and continuing at one end in a journal bore opening through one end of said body,
a ratchet pawl having one generally semicylindrical end positioned in said recess, a cylindrical intermediate portion journaled in said journal bore, and another semicylindrical end projecting beyond the other end of said body,
said other end of said pawl having a transverse face approximately parallel to the rotation axis of the pawl,
said one end of said pawl having two longitudinal edges selectively engageable with said ratchet teeth by rotation of said pawl in said recess to lock said body and ratchet wheel against relative rotation in one direction or the other depending upon which pawl edge edge engages said teeth,
a pawl reversing member rotatably mounted on the other end of said body,
a plunger tube carried on and extending generally radially of said pawl reversing member to a position in the vicinity of said transverse pawl face,
there being an opening through said tube which opens to the outside of said latter member,
a plunger slidably fitted in said one end of said tube and engaging said transverse pawl face,
a spring in said tube seating at one end against said plunger,
a set screw threaded in the other end of said tube and seating against the other end of said spring,
said set screw being accessible exteriorly of said member,
said member being rotatable on said body between one position in which said plunger engages said pawl at one side of its rotation axis, whereby to resiliently urge one pawl edge into engagement with said ratchet teeth, and another position wherein said plunger engages said pawl at the opposite side of its rotation axis, whereby to resiliently urge the other pawl edge into engagement with said ratchet teeth, and
yieldable detent means acting between said body and member for releasably retaining the latter in said positions thereof, respectively.

References Cited in the file of this patent

UNITED STATES PATENTS

| | | |
|---|---|---|
| 2,404,092 | Reynolds | July 16, 1946 |
| 2,712,257 | Fish | July 5, 1955 |

FOREIGN PATENTS

| | | |
|---|---|---|
| 545,561 | Canada | Aug. 27, 1957 |
| 14,644 | Germany | Dec. 13, 1956 |